(12) United States Patent
Cannon et al.

(10) Patent No.: US 11,403,721 B2
(45) Date of Patent: *Aug. 2, 2022

(54) DATA MINING DATA RECORDS TO DETERMINE NETWORKS AND BOUNDARIES

(71) Applicant: CoreLogic Solutions, LLC, Irvine, CA (US)

(72) Inventors: Matt Cannon, Philadelphia, PA (US); Wei Liu, San Diego, CA (US); Jon Wierks, Irvine, CA (US)

(73) Assignee: CoreLogic Solutions, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/938,796

(22) Filed: Jul. 24, 2020

(65) Prior Publication Data

US 2021/0110491 A1 Apr. 15, 2021

Related U.S. Application Data

(63) Continuation of application No. 15/335,291, filed on Oct. 26, 2016, now Pat. No. 10,726,509.

(60) Provisional application No. 62/377,441, filed on Aug. 19, 2016.

(51) Int. Cl.
| | | |
|---|---|---|
| *G06Q 50/16* | (2012.01) | |
| *G06Q 30/02* | (2012.01) | |
| *G06Q 30/00* | (2012.01) | |
| *G06F 40/205* | (2020.01) | |

(52) U.S. Cl.
CPC .......... *G06Q 50/16* (2013.01); *G06F 40/205* (2020.01); *G06Q 30/0185* (2013.01); *G06Q 30/0278* (2013.01)

(58) Field of Classification Search
CPC ...................................................... G06Q 50/16
USPC .......................................................... 707/749
See application file for complete search history.

(56) References Cited

U.S. PATENT DOCUMENTS

| | | | | |
|---|---|---|---|---|
| 5,361,201 | A * | 11/1994 | Jost | G06Q 40/00 705/35 |
| 6,107,961 | A * | 8/2000 | Takagi | G01C 21/34 342/357.64 |
| 7,686,214 | B1 * | 3/2010 | Shao | G06Q 20/382 235/380 |
| 8,001,024 | B2 | 8/2011 | Graboske et al. | |
| 8,732,219 | B1 | 5/2014 | Ferries et al. | |
| 2002/0052755 | A1 * | 5/2002 | Whatley | G06Q 30/0601 705/306 |
| 2005/0047327 | A1 | 3/2005 | Saleh et al. | |
| 2005/0216292 | A1 * | 9/2005 | Ashlock | G06Q 30/0278 705/306 |
| 2009/0132469 | A1 * | 5/2009 | White | G06Q 10/00 |

(Continued)

*Primary Examiner* — Muluemebet Gurmu
(74) *Attorney, Agent, or Firm* — Knobbe Martens Olson & Bear LLP

(57) ABSTRACT

Systems and methods for determining a boundary from evaluation records for objects are disclosed. In some embodiments, evaluation records for objects (e.g., appraisal records for real estate properties) are accessed. The evaluation records can be used to identify objects with similar characteristics. By representing objects identified as nodes in a graph, edges between nodes representing the identified objects can be established. A network generated from the nodes and edges can be used to identify a boundary comprising objects having similar characteristics.

20 Claims, 13 Drawing Sheets

(56) References Cited

U.S. PATENT DOCUMENTS

2013/0077819 A1 3/2013 Du et al.
2013/0101234 A1 4/2013 Den Herder et al.
2013/0197807 A1 8/2013 Du et al.

* cited by examiner

DATA MINING DATA RECORDS TO DETERMINE NETWORKS AND BOUNDARIES

CROSS-REFERENCE TO RELATED APPLICATIONS

This application is a continuation of U.S. application Ser. No. 15/335,291, filed on Oct. 26, 2016, entitled "DATA MINING DATA RECORDS TO DETERMINE NETWORKS AND BOUNDARIES," which claims the benefit of priority under 35 U.S.C. § 119(e) to U.S. Provisional Application No. 62/377,441, filed on Aug. 19, 2016, entitled "DATA MINING GEOCODED LOCATION DATA TO DETERMINE NETWORKS AND NEIGHBORHOODS," each of which is hereby incorporated by reference herein in its entirety.

BACKGROUND

Field

The present disclosure relates to data mining data records (e.g., appraisal records) and in particular to determining networks and boundaries (e.g., neighborhoods) from the data records.

Description of the Related Art

Entities such as real estate brokers, mortgage lenders, banks, insurance companies, utilities, and so forth may wish to obtain information about one or more real estate properties in a neighborhood. For example, a real estate broker or property appraiser may want to provide a valuation for a specific real estate property and may wish to obtain information about other real estate properties in the neighborhood of the specific real estate property (e.g., comparables) as part of the valuation process. Such entities may access a computerized database of real estate properties to obtain information about the properties.

SUMMARY

A system for determining a boundary from evaluation records for objects is disclosed. The system comprises: non-transitory computer storage configured to store data records for objects; and a hardware processor in communication with the non-transitory computer storage, the hardware processor programmed to: access the evaluation records for objects, the objects represented as nodes in a network; parse the evaluation records to identify objects having similar characteristics; establish edges between nodes representing the identified objects; and generate a network from the nodes and edges. The hardware processor can be programmed to identify, from the network, a boundary comprising nodes having similar characteristics. In some embodiments, the hardware processor can be programmed to determine a status of the network, such as a tighter network or a looser network. The status of the network can be based on the number of edges within the network or a percentage of nodes that are connected within the network. For example, a tighter network can include more edges, and a looser network can include fewer edges. The status of the network can be an indication of the confidence of the boundary identified. For example, a tighter boundary can indicate a higher quality boundary identified.

A method for determining a neighborhood from real estate property appraisal records in a geographic region is disclosed. The method is under control of a hardware processor and comprises: accessing appraisal records for real estate properties in a geographic region, the real estate properties represented as nodes in a network; parsing the appraisal records to identify nodes having similar characteristics; establishing edges between the identified nodes; and generating a network from the identified nodes and edges. The method can include identifying, from the network, a neighborhood of nodes having similar characteristics. In some embodiments, the method can include determining a status of the network, such as a tighter network or a looser network. The status of the network can be based on the number of edges within the network or a percentage of nodes that are connected within the network. For example, a tighter network can include more edges, and a looser network can include fewer edges. The status of the network can be an indication of the confidence of the neighborhood identified. For example, a tighter neighborhood can indicate a higher quality neighborhood identified.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1A:
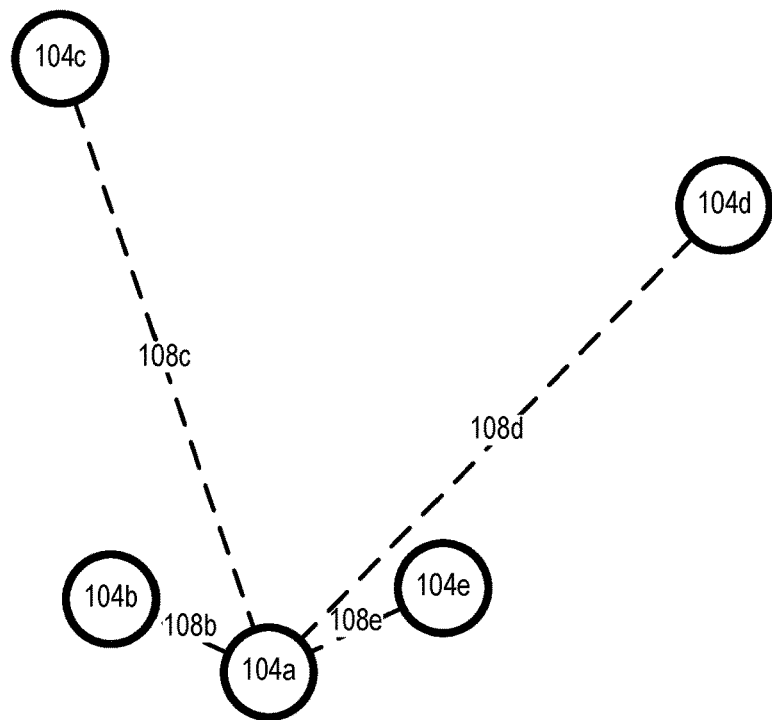
FIGS. 1A-1E show examples of graphs of nodes representing objects connected with edges forming boundaries of the nodes.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

During an object evaluation process, a number of objects that are comparables to the subject object can be used for comparison. The comparable objects can generally have similar characteristics. For example, if the object being evaluated is a real estate property, the comparable objects can be a number of sales and listings that are comparables to the subject property. Such comparable objects can be referred to as "comparables" or "comps."

Embodiments of the present method use the evaluation comparable information to define links among objects (e.g., to form a network). Additionally, the network formed can be overlaid with relationship information of the objects to show boundaries of the objects. For example, the network formed can be overlaid with geographic information of real estate properties (i.e., the relationship between of the objects) to show neighborhood boundaries (i.e., boundaries of the objects).

The source of the relationship information can be different in different implementations. For example, for objects that are real estate properties, the relationship information can be retrieved from a geographic information service (GIS) such as Google Maps or Earth. As another example, for objects that are network computers, the relationship information can be retrieved from a domain name registrar or an internet service provider (ISP).

The network can also identify boundaries that might include objects that can be substitutes for each other. For example, a boundary can include objects that are likely to be substitutes for a reference object (e.g., a property being appraised) in that the substitute objects have similar characteristics (e.g., properties in similar areas). Objects within a boundary generally can serve as good comparables for the reference object. Accordingly, an evaluation may be based on objects in an identified boundary to serve as comparables for the reference object.

Embodiments of the present method can use data mining techniques to mine a large database of evaluation records associated with the objects to identify similar objects and to identify boundaries. Accordingly, analysis of the evaluation records can lead to the identification of boundaries of similar objects even though no individual evaluation had identified such objects as being within a boundary. Additionally, some boundaries may be geographically distinct from other boundaries (e.g., physically spaced apart such that no portions of the boundaries intersect each other). The method can identify objects from such non-contiguous boundaries as being comparable to a reference object.

Embodiments of the method can identify boundaries based on one or more object characteristics. For example, the method could identify objects within a boundary based on one or more object characteristics or properties. In some embodiments, for objects that are real estate properties, the method could identify a neighborhood of properties based on one or more of type of floor plan, area (e.g., area of a living space and/or area of the yard), type of residential property (e.g., single-family residence, condominium, townhome), geography, or presence of amenities (e.g., a pool, nearby parks, schools, etc.). In some embodiments, for objects that are network computers, the method could identify a boundary including network computers based on one or more of bandwidth, processing power, network location, or the number of users.

Example Method of Using Networks of Evaluation Comparables to Define Boundaries

Two or more relationships can exist between objects (e.g., real estate properties). An example relationship between objects can represent whether the objects have been previously used as comparables of one another. During an object evaluation process, a number of objects that are comparables to the subject object can be used for comparison. The comparable objects can generally have similar characteristics or properties. For example, if the object being evaluated is a real estate property, the comparable objects can be a number of sales and listings that are comparables to the subject property. Such comparable objects can be referred to as "comparables" or "comps." As another example, if an object is a network computer, a comparable of the object can be another network computer such that the two network computers have similar characteristics (e.g., computation power, number of users, etc.).

Another example relationship between objects can represent whether objects are within a boundary. This boundary can be based on different characteristics or properties in different implementations. For example, for objects that are real estate properties, objects within a boundary can be real estate properties that are within a neighborhood. As another example, if objects are network computers, then objects within a boundary can be objects that belong to the same company, an office of a company, a floor of an office building, or a local area network.

One relationship between objects can be used to determine another relationship between objects. For example, during an object evaluation process, a number of objects that are comparables to the subject object can be used for comparison. During another object evaluation process, other objects that are comparables to another subject object can be used for comparison. The subject object in the former evaluation process can be a comparable to the subject object in the latter evaluation process. Accordingly, a relationship between the objects (including the subject objects and the comparables) in the two evaluation processes can be established. This relationship can be used to establish another relationship between the objects. This other relationship can be a boundary that includes the subject objects and the comparables in the two evaluation processes.

As another example, if the objects are real estate properties, during a property appraisal process, a number of properties that are comparables to the subject property can be used for comparison. During another property appraisal process, properties that are comparables to another subject property can be used for comparison. The subject property in the former appraisal process can be a comparable to the subject property in the latter appraisal process. Accordingly, a relationship between the properties in the two appraisal processes can be established. This relationship can be used to establish another relationship between the properties, such as a neighborhood that includes the properties. This other relationship may be established for properties in neighborhoods that are non-contiguous due to the presence of, for example, a mountain or a river.

FIGS. 1A-1E show graphs 100 of nodes representing objects (e.g., real estate properties) connected by edges forming boundaries (e.g., neighborhoods) superimposed on the graphs. If an evaluation for an object A 104a uses objects B 104b, C 104c, D 104d, and E 104e as comparable objects, the five objects can be thought of as nodes, and the links between object A 104a and the other four objects B 104b, C 104c, D 104d, and E 104e can be thought of as edges in a network. These are represented as the lines 108b, 108c, 108d, and 108e in FIG. 1A.

Figure 1B:
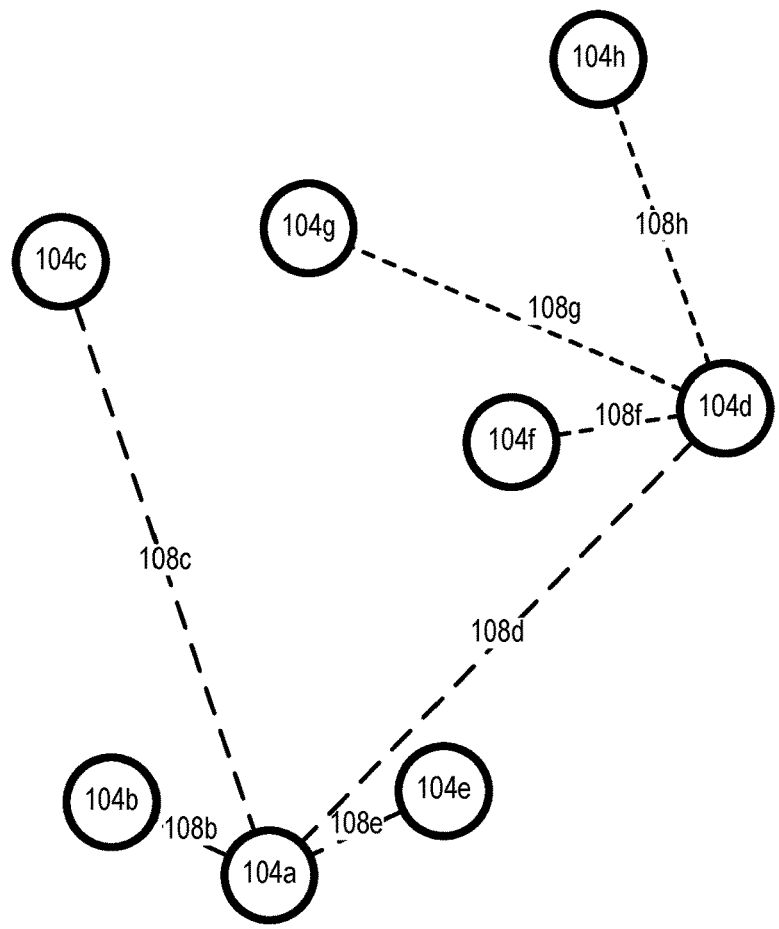

As illustrated in FIG. 1B, if at another time object D 104d had been evaluated using objects F 104f, G 104g, and H 104h as comparable objects, object D 104d is linked by three edges to the other three objects F 104f, G 104g, and H 104h. These are represented by the lines 108f, 108g, and 108h in FIG. 1.

Figure 1C:
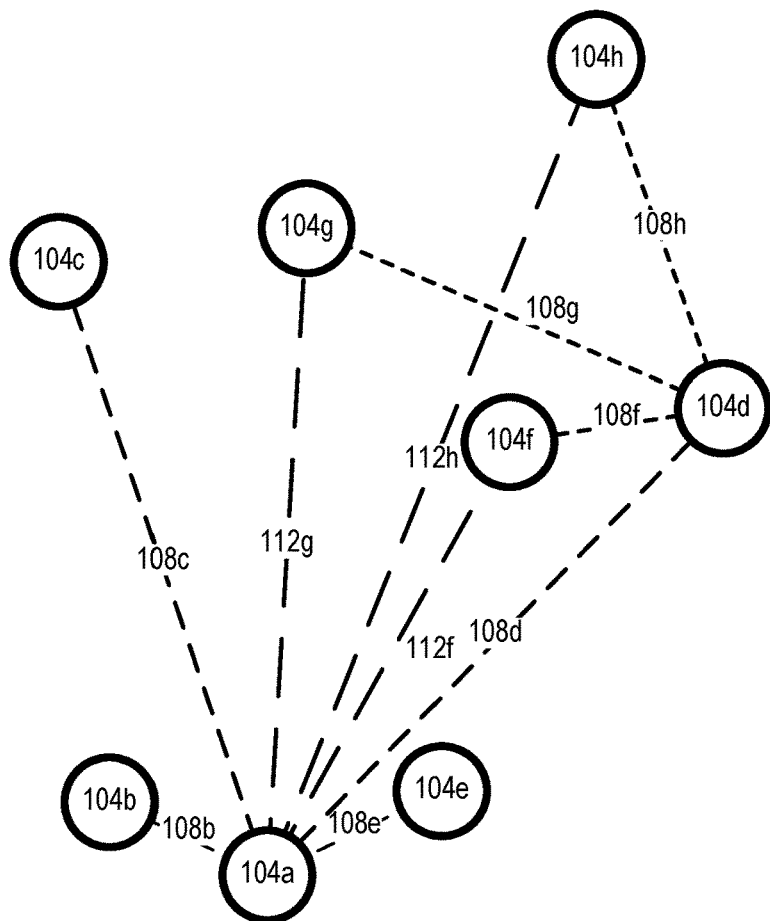
Figure 1D:
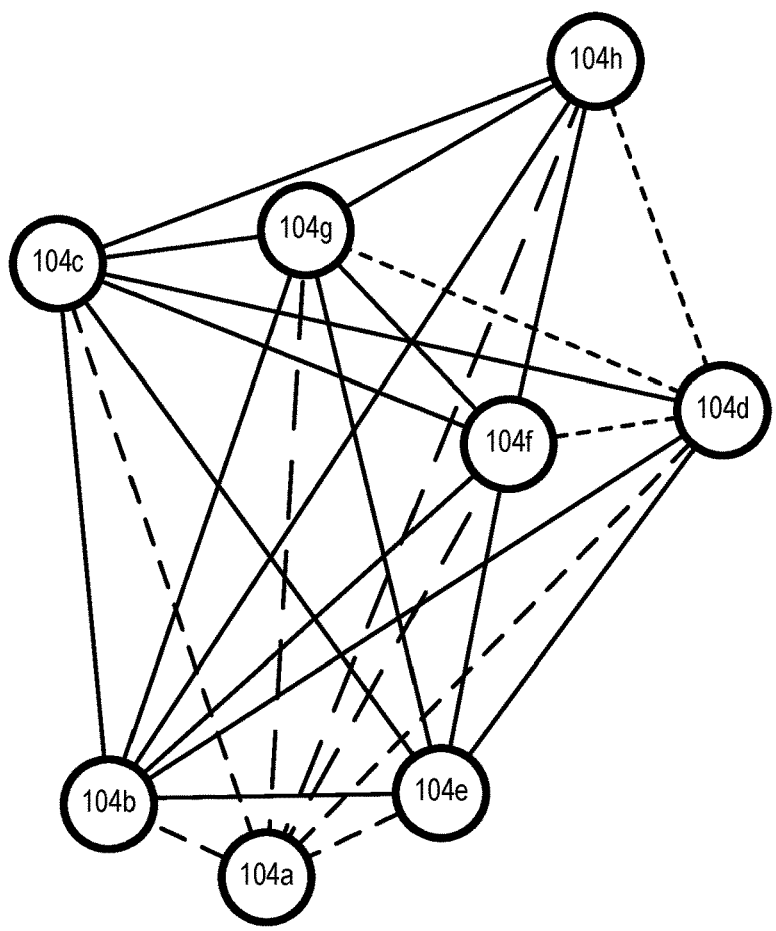

FIG. 1C illustrates that object A 104a can be linked to these three objects F 104f, G 104g, and H 104h indirectly, via object D 104d. This is represented by the lines 112f, 112g, and 112h in FIG. 1C. It is possible to expand the edges because objects A 104a and D 104d were comparables to each other. Thus, all of the comparables for each are comparables with each other. This is represented by the solid lines in FIG. 1D.

There may be a limit to the number of edges before the similarities become too broad. For example, the method may stop connecting nodes after 2, 3, 4, 5, 6, 7, 10, or more degrees of separation from the original, reference object.

Edges between nodes of the network can be weighted. Weights can represent relationships (e.g., shorter edges may be weighted more than longer edges to reflect that more nearby objects generally tend to be better comparables than more distant objects), degrees of separation, whether an evaluation has actually identified an object as a comparable for another object in the network, etc. Weighted networks may advantageously more accurately identify boundaries than unweighted networks that treat all nodes equivalently.

Figure 1E:
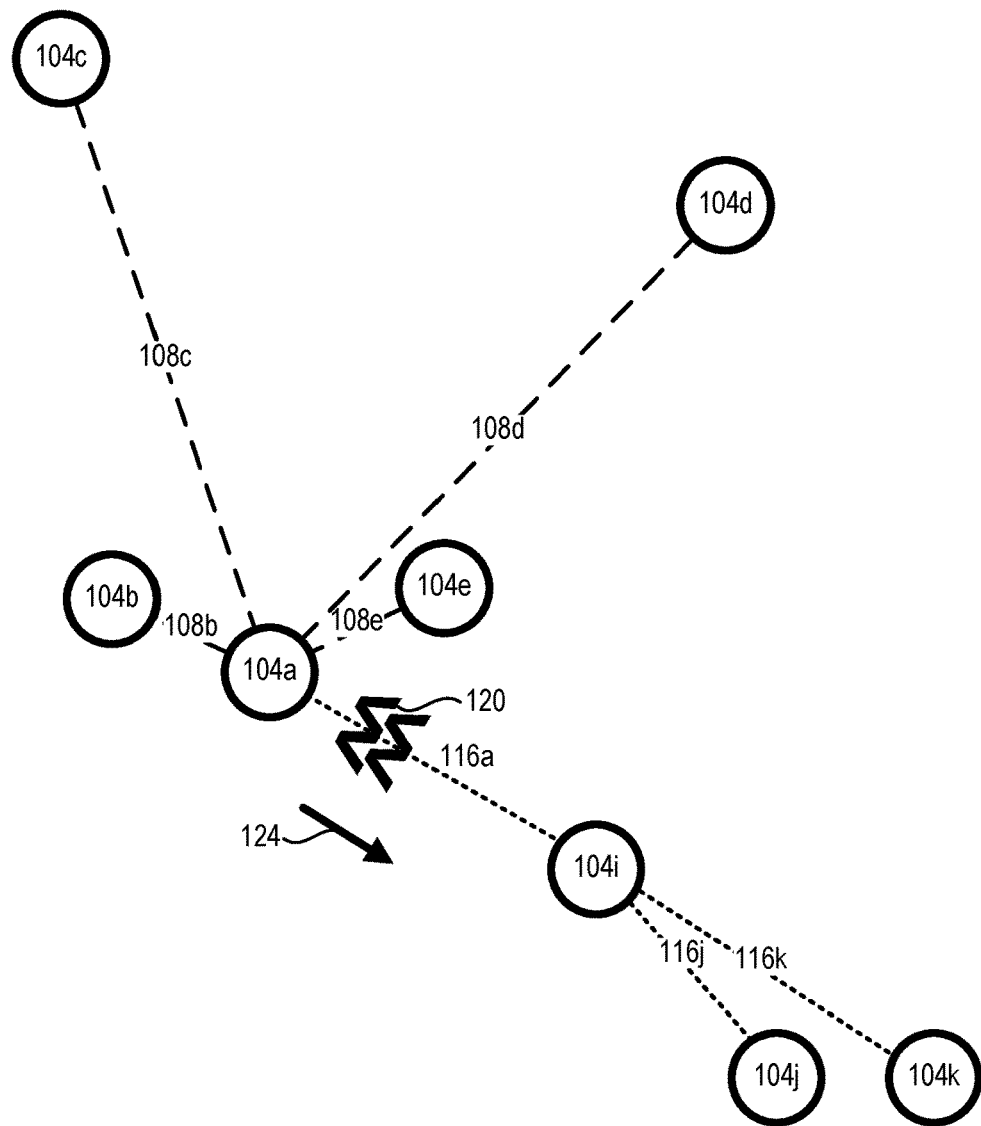

When more subject/comparable relationships are identified, a spider web-like network of related objects is created. These networks start to define boundaries (e.g., neighborhood boundaries for real estate properties). They also reveal related boundaries which are not connected or contiguous. For example, neighborhoods of real estate properties may be physically not be contiguous because of the presence of a mountain or a river between the neighborhoods of real estate properties. As another example, boundaries of network computers may not be contiguous or directly connected because the network computers may belong to different local area networks or be separated by a firewall. FIG. 1E schematically illustrates objects in two non-contiguous boundaries. One of the two non-continuous boundaries includes object A 104*a* connected to objects B 104*b*, C 104*c*, D 104*d*, and 104*e* by lines 108*b*, 108*c*, 108*d*, and 108*e*. The other of the two non-contiguous boundaries includes object I 104*i* connected to objects A 104*a*, J 104*j*, and K 104*k* by lines 116*a*, 116*j*, and 116*k*. Objects A 104*a* and I 104*i* can be separated by a barrier 120 (e.g., a firewall, a mountain, or a river). Objects A 104*a*, J 104*j*, and K 104*k* have been used as comparables in an evaluation for object I 104*i*. Thus, object I 104*i* is linked by three edges (not shown) to the other four objects B 104*b*, C 104*c*, D 104*d*, and E 104*e*.

An arrow 124 in FIG. 1E is shown to highlight that there exists a relationship between the two non-contiguous boundaries. Accordingly, an evaluation can use the identified boundaries to search for additional comparables for a particular object. Automated valuation method (AVM) systems can also use the boundaries identified by the present method to search for and identify comparable objects as the AVM performs its automated valuation for a particular object.

After establishing all of the connections among the objects in a boundary using the evaluation data, it is possible to append other information for each of the objects (e.g., geocoded information for real estate properties). This can allow for blending the network information with other information such as geographic information.

The present method can data mine a massive repository of historical and current evaluations to identify networks and boundaries. An outcome of such a method is to allow users to select objects from identified boundaries. This information can be used on its own, as well as improving existing models such as AVMs used for object valuations (e.g., property valuations).

Example Method of Using Networks of Appraisal Comparables to Define Neighborhood Boundaries Data mining techniques can be used to mine a data store comprising tens of thousands to hundreds of thousands to millions or more records (e.g., records of geocoded locations in a geographic area such as a city, a county, a state, or country). The geocoded data can represent residential or commercial real estate properties. The geocoded data can be represented as nodes in a network (sometimes also referred to as a graph) and relationships among the nodes can be established. The network can be analyzed to identify groups of nodes having similar characteristics. A group of nodes may represent a neighborhood. Non-contiguous (e.g., geographically separated) neighborhoods can be identified from the network.

During a real estate appraisal process, an appraiser selects a number of sales and listings that are comparables to the subject property. The sales and listings can generally have similar property, location and neighborhood characteristics. Such comparable properties can be referred to as "comparables" or "comps."

Embodiments of the present method use the appraisal comparable information to define links among properties (e.g., to form a network). Additionally, the defined property network information can be overlaid with geographic information to show neighborhood boundaries. The geographic information can come from a geographic information service (GIS) such as, e.g., Google Maps or Earth. The network can also identify neighborhoods that might be substitutions for each other. For example, a neighborhood can include properties that are likely to be substitutes for a reference property (e.g., a property being appraised) in that the substitute properties have similar characteristics (e.g., area, number of bedrooms, etc.). Properties in a neighborhood generally can serve as good comparables for the reference property. Accordingly, an appraiser may select properties in an identified neighborhood to serve as comparables for the reference property.

Embodiments of the present method can use data mining techniques to mine a large database of appraisal records associated with the geocoded properties to identify similar properties and to identify neighborhoods. Accordingly, analysis of the appraisal records can lead to the identification of neighborhoods of similar properties even though no individual appraiser had identified such properties as a neighborhood. Additionally, some neighborhoods may be geographically distinct from other neighborhoods (e.g., physically spaced apart such that no portions of the neighborhoods intersect each other). The method can identify properties from such non-contiguous neighborhoods as being comparable to a reference property.

Embodiments of the method can identify neighborhoods based on one or more property characteristics. For example, the method could identify a neighborhood of properties based on one or more of a type of floor plan, area (e.g., area of a living space and/or area of the yard), type of residential property (e.g., single-family residence, condominium, townhome), geography, presence of amenities (e.g., a pool, nearby parks, schools, etc.).

FIGS. 2A-2E show maps 200 of real estate properties in a geographic region with neighborhoods superimposed on the maps. If an appraisal for property A 104*a* uses properties B 104*b*, C 104*c*, D 104*d*, and E 104*e* as comparable properties, the five properties can be thought of as nodes, and the links between property A 104*a* and the other four properties B 104*b*, C 104*c*, D 104*d*, and E 104*e* can be thought of as edges in a network. These are represented as the lines 108*b*, 108*c*, 108*d*, and 108*e* in FIG. 2A.

Figure 2A:
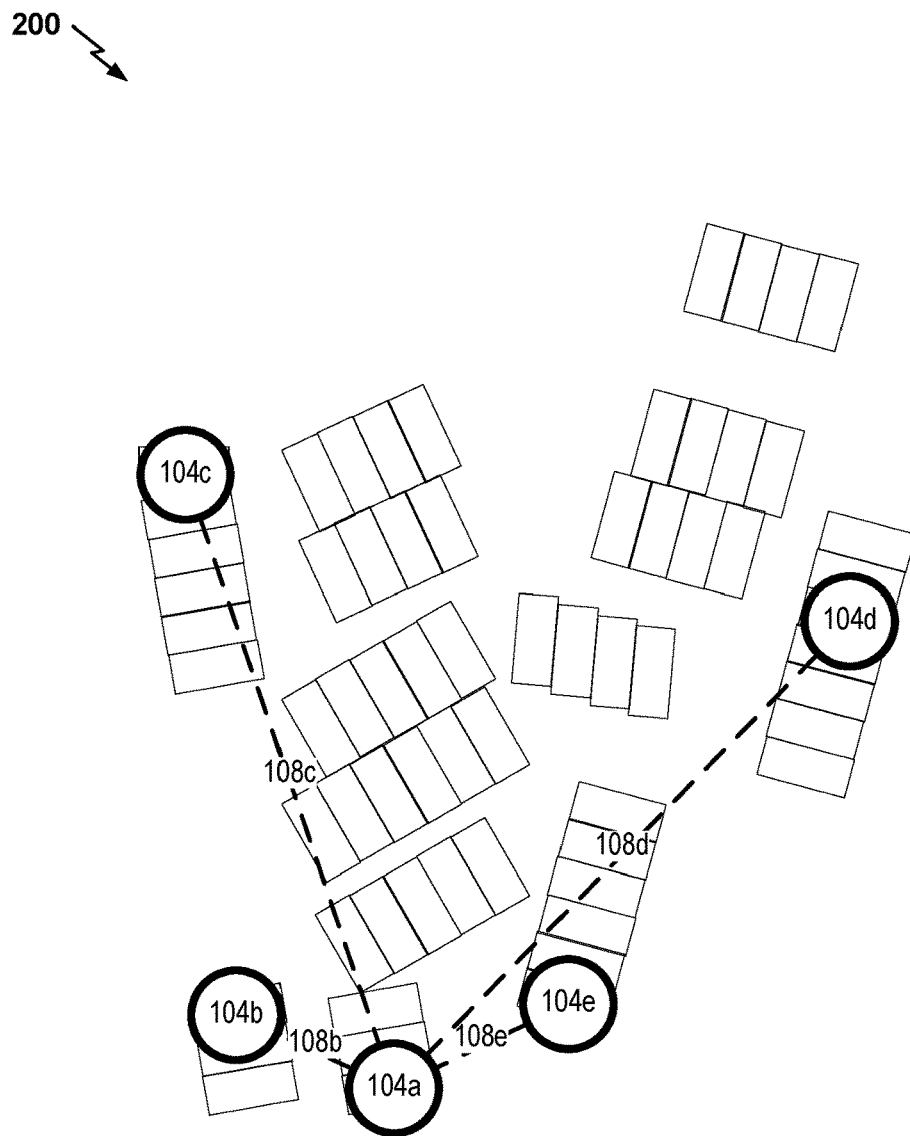
FIGS. 2A-2E show example maps of real estate properties in a geographic region with neighborhoods superimposed on the maps.
Figure 2B:
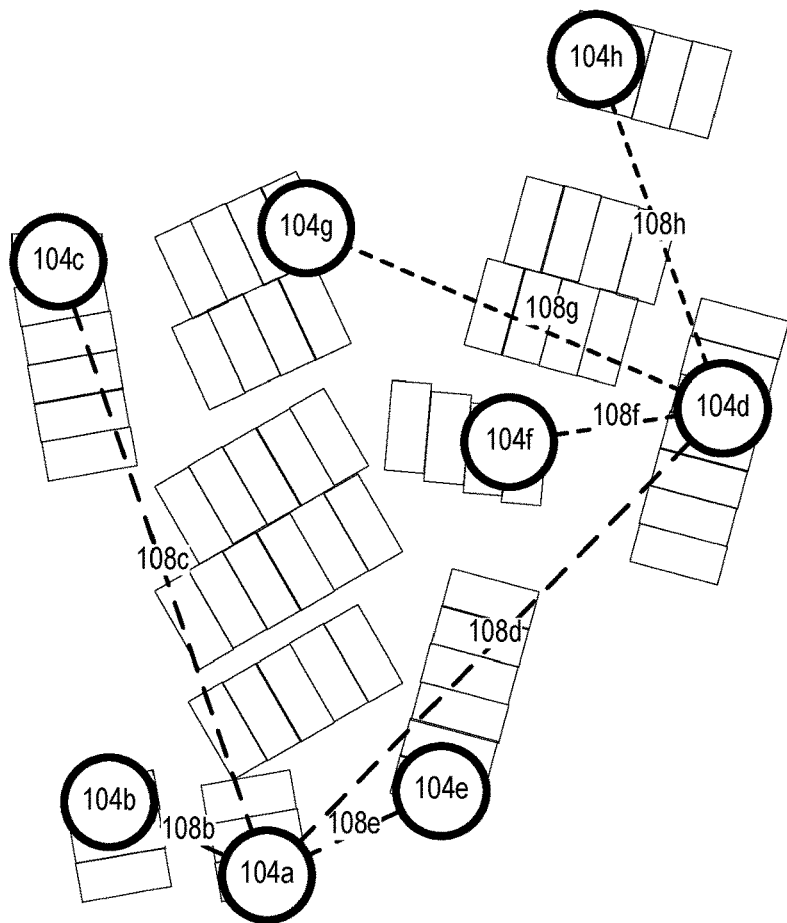

As illustrated in FIG. 2B, if at another time property D 104*d* had been appraised using properties F 104*f*, G 104*g*, and H 104*h* as comparable properties, property D 104*d* is linked by three edges to the other three properties F 104*f*, G 104*g*, and H 104*h*. These are represented by the lines 108*f*, 108*g*, and 108*h* in FIG. 2.

Figure 2C:
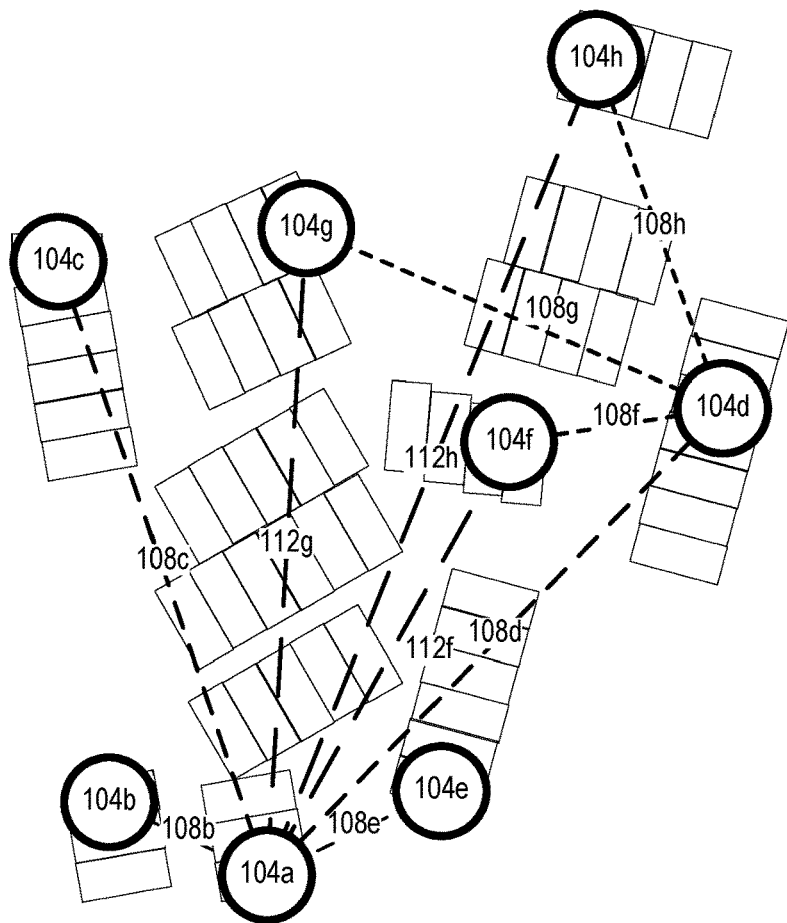
Figure 2D:
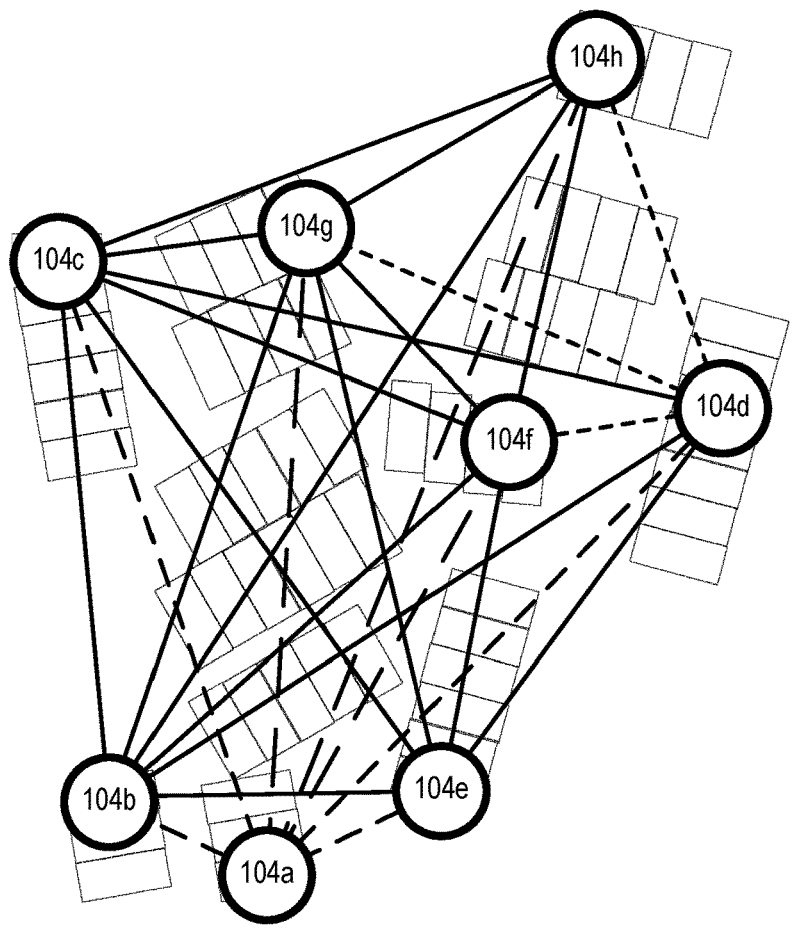

FIG. 2C illustrates that property A 104*a* can be linked to these three properties F 104*f*, G 104*g*, and H 104*h* indirectly, via property D 104*d*. This is represented by the lines 112*f*, 112*g*, and 112*h* in FIG. 2C. It is possible to expand the edges. Because properties A 104*a* and D 104*d* were comparables to each other, all of the comparables for each are comparables with each other. This is represented by the solid lines in FIG. 2D.

There may be a limit to the number of edges before the similarities become too broad. For example, the method may stop connecting nodes after 2, 3, 4, 5, 6, 7, 10, or more degrees of separation from the original, reference property.

Edges between nodes of the network can be weighted. Weights can represent geographic relationships (e.g., shorter edges may be weighted more than longer edges to reflect that more nearby properties generally tend to be better comparables than more distant properties), degrees of separation, whether an appraiser has actually identified a node as a comparable for another node in the network, etc. Weighted networks may advantageously more accurately identify neighborhoods than unweighted networks that treat all nodes equivalently.

When more subject/comparable relationships are identified (and which may be plotted on a map obtained from a GIS service), a spider web-like network of related properties is created. These networks start to define neighborhood boundaries. They also reveal related neighborhoods which are not contiguous (e.g., physically non-contiguous because of the presence of a mountain or a river between neighborhoods). See FIG. 2E for example, which schematically illustrates two non-contiguous neighborhoods. One of the two non-continuous neighborhoods includes property A 104*a* connected to properties B 104*b*, C 104*c*, D 104*d*, and 104*e* by lines 108*b*, 108*c*, 108*d*, and 108*e*. The other of the two non-contiguous neighborhoods includes property I 104*i* connected to properties A 104*a*, J 104*j*, and K 104*k* by lines 116*a*, 116*j*, and 116*k*. Properties A 104*a* and I 104*i* can be separated by a mountain or a river 120. Properties A 104*a*, J 104*j*, and K 104*k* have been used as comparables in an appraisal for property I 104*i*. Thus, property I 104*i* is linked by three edges (not shown) to the other four properties B 104*b*, C 104*c*, D 104*d*, and E 104*e*.

Figure 2E:
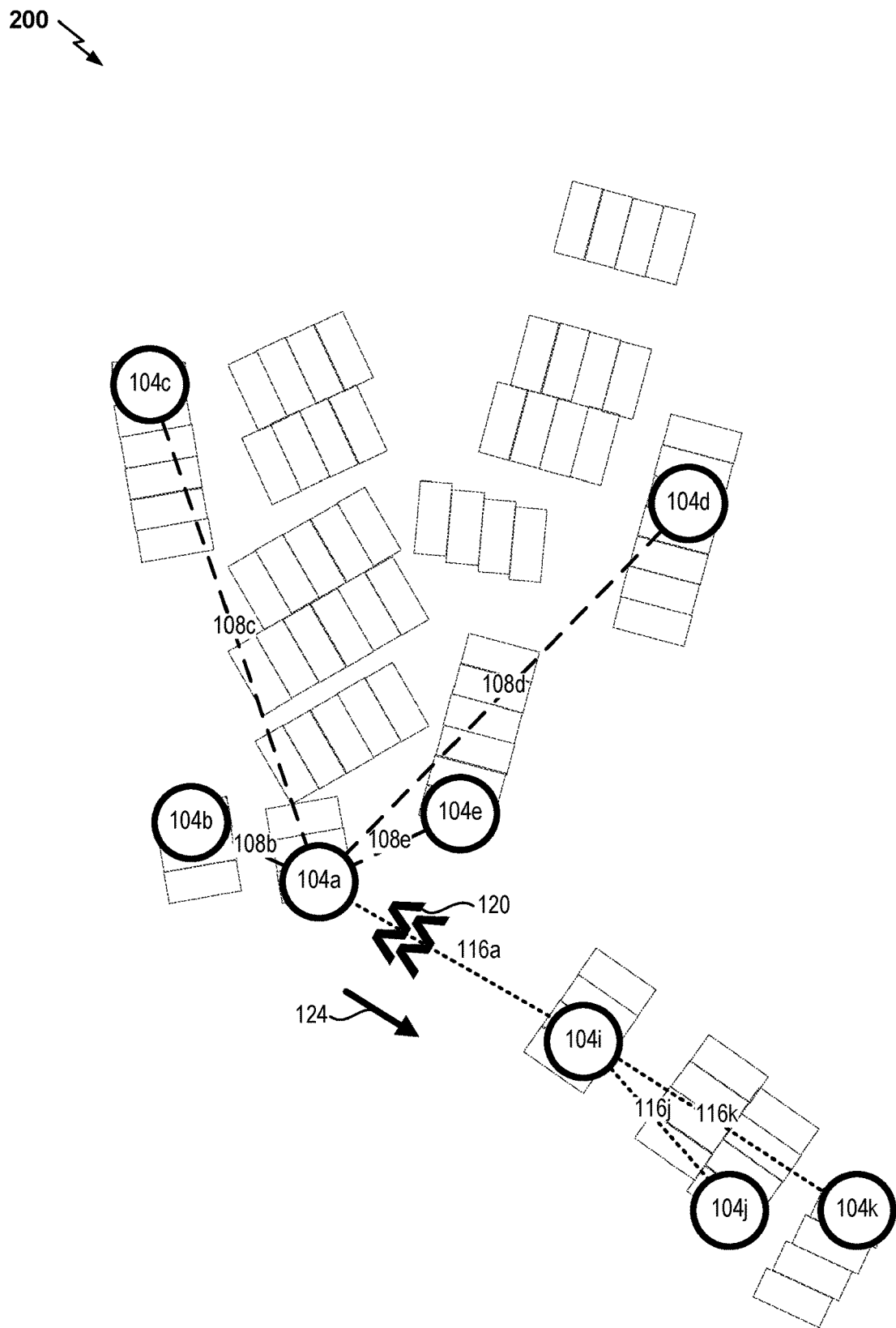

An arrow 124 in FIG. 2E is shown to highlight that there exists a relationship between the two non-contiguous neighborhoods. Accordingly, an appraiser, who might not have been aware that these two non-contiguous neighborhoods actually contain comparables for each other, can use the identified neighborhoods to search for additional comparables for a particular property. Automated valuation method (AVM) systems can also use the neighborhoods identified by the present method to search for and identify comparable properties as the AVM performs its automated valuation for a particular property.

After establishing all of the connections among the properties in an area using the appraisal data, it is possible to append geocoded information for each of the properties. This can allow for blending the network information with geographic information.

The present method can data mine a massive repository of historical and current appraisals in regions around the country (e.g., available from CoreLogic, Inc. (Irvine, Calif.)) to identify networks and neighborhoods.

An outcome of such a method is to allow users to select properties from identified geographic neighborhoods. This information can be used on its own, as well as improving existing models such as AVMs used for property valuations.

Some specific, non-limiting, uses for this method:

(1) Appraisal Review: A reviewer or automated review system can quality check the comparables on an appraisal report to see if they are in appropriate neighborhoods. This would alert to when inappropriate comparables are used by the appraiser, thus preventing fraud.

(2) Appraiser Tools: When an appraiser is performing an appraisal, they can clearly see where other appraisers have chosen comps from. This will help their research and speed up the appraisal process.

(3) AVM models can use the network to determine which comparables are most likely to be similar to the subject. Also the AVM can use the defined neighborhood boundaries to only use data from the subject property's neighborhood. Both of these uses would improve AVM accuracy.

The method can be implemented by a hardware computing processor in communication with the non-transitory data store that is used to store the property records. In practice, thousands to up to hundreds of millions of records can be in the data store, and sophisticated data mining and database management techniques can be used to efficiently parse the records to generate the networks and to identify the neighborhoods.

Example Process for Determining Neighborhood Boundaries

Figure 3:
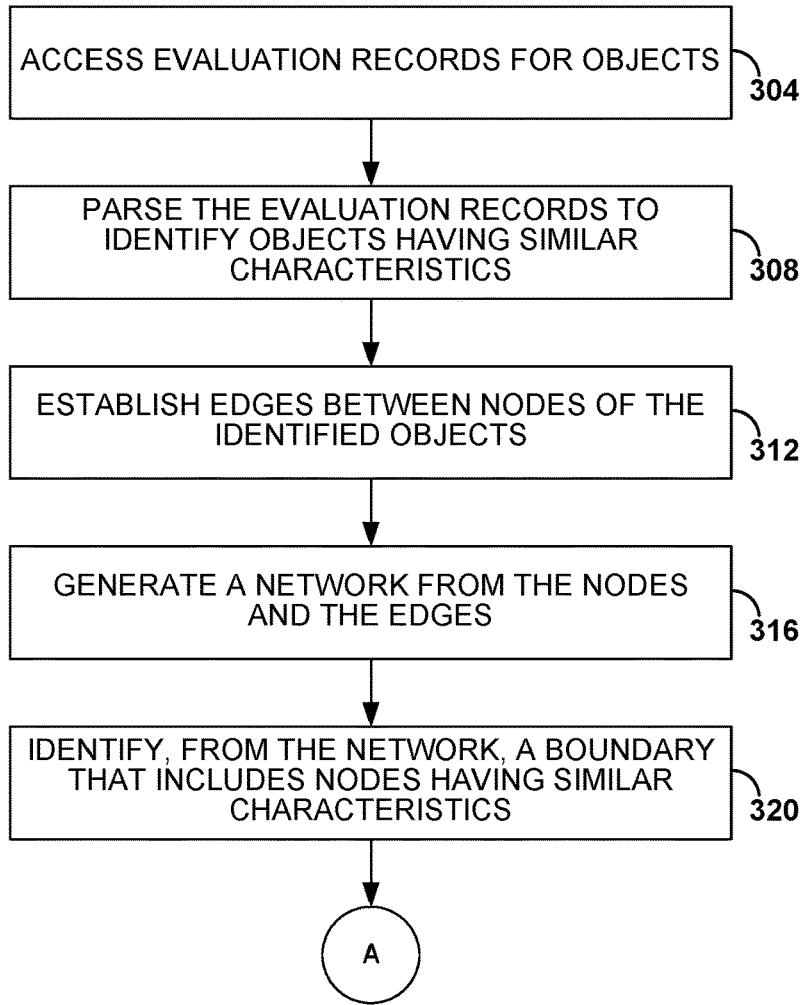
FIG. 3 is a flow diagram of an example process of a boundary/neighborhood determination process for determining boundaries of objects such as neighborhoods of real estate properties.

FIG. 3 is a flowchart that schematically illustrates an example of a boundary/neighborhood determination process 300 for determining boundaries of objects such as neighborhoods of real estate properties. The determination process 300 can be performed by a boundary/neighborhoods service 520 of a data mining engine 500 shown in FIG. 5 and described in greater detail below. The determination process 300 can include some or all of the actions described with reference to the example objects or properties 104*a*-104*k* illustrated in FIG. 1A-1E or 2A-2E.

At block 304, the determination process 300 can access evaluation records for objects (e.g., real estate properties). For example, the determination process 300 can access appraisal records for real estate properties in a geographic region. The evaluation records can include objects that have been used as comparables in evaluations. The evaluation records can be retrieved from a data repository such as a data repository 530 shown in FIG. 5.

At block 308, the determination process 300 can optionally parse the evaluation records (e.g., appraisal records) to identify objects having similar characteristics. The identified objects can be represented as nodes in a network. Objects can have similar characteristics if they appear in one evaluation record. Parsing the data records can comprise determining whether an evaluation identified a first object as a comparable for a second object. The evaluation can comprise an appraisal of real estate properties. For example, parsing the evaluation records can comprise parsing appraisal records to determine whether an appraiser has identified a first real estate property as a comparable for a second real estate property. In some embodiments, an Automated Valuation Model (e.g., available from CoreLogic, Inc. (Irvine, Calif.)) can identify real estate properties that comparables. A network of comparables identified by an Automated Valuation Model can be used in addition to or as an alternative to an appraiser-generated network of comparables. The network can include nodes having a degree of separation from an initial node that is less than a threshold degree of separation. The threshold degree of separation can be, 2, 3, 4, 5, 6, 7, 10, or more degrees of separation from the initial object.

At block 312, the determination process 300 can establish edges between nodes representing the identified objects. For example, the determination process 300 can establish edges between nodes representing real estate properties that have been used as comparables in appraisal records. Optionally, the determination process 300 can weigh the edges or the nodes. Weights can represent relationship such as relationships (e.g., shorter edges may be weighted more than longer edges to reflect that more nearby objects generally tend to be better comparables than more distant objects), degrees of separation, whether an evaluation has actually identified an object as a comparable for another object in the network, etc. Weighted networks may advantageously more accurately identify boundaries than unweighted networks that treat all nodes equivalently.

At block 316, the determination process 300 can generate a network from the nodes and the edges. For example, a network can include nodes that represent real estate properties that have been used as comparables in appraisal records. The edges can connect the comparable properties. As another example, a network can include nodes that represent network computers that have been used as comparables in evaluation records of speed testing. The edges can connect the comparable computers. The nodes and the edges form a graph.

At block 320, the determination process 300 can optionally identify, from the network, a boundary comprising nodes having similar characteristics. Identifying the neighborhood can comprise identifying a geographic boundary to the network. For example, the boundary can include objects that have been used as comparables in evaluations. As another example, the boundary can be a neighborhood of properties that have been used as comparables in appraisal records (e.g., a neighborhood of properties A 104a, B 104b, C 104c, D 104d, E 104e, F 104f, G 104g, and H 104h shown in FIG. 2).

The determination process 300 can optionally determine a status of the network, such as a tighter network or a looser network, or a status score of the network. The status of the network or the status score of the network can be based on the number of edges within the network or a percentage of nodes that are connected within the network. For example, a tighter network or a network with a higher status score can include more edges. A looser network or a network with a lower status score can include fewer edges. The status or status score of the network can be a confidence indication of the boundary identified. For example, a tighter boundary can indicate a higher quality boundary identified. As another example, a tighter boundary can indicate a higher quality neighborhood identified.

Figure 4:
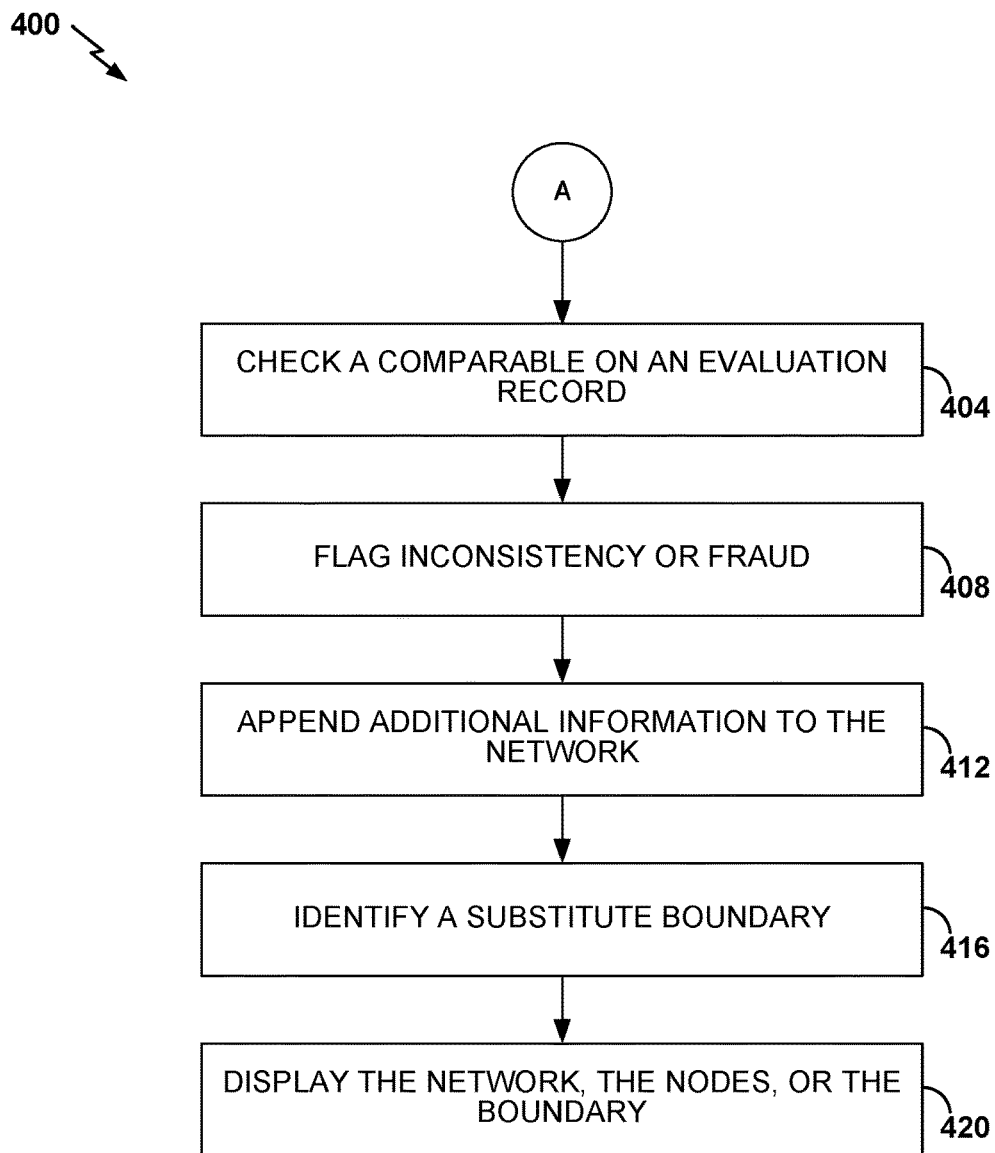
FIG. 4 is a flow diagram of an example process of using a boundary/neighborhood determined in FIG. 3.

FIG. 4 a flow diagram of an example process 400 of using a boundary/neighborhood determined in FIG. 3 The illustrative process 400 may be implemented following implementation of process 300, discussed above, such that block 404 occurs subsequent to block 320 described above.

At block 404, the process 400 can check a comparable on an evaluation record to determine if the comparable has been selected from the identified boundary. At block 408, the process 400 can flag the evaluation record (e.g., an appraisal of real estate properties) for inconsistency (such as a fraud) or further review if the comparable was not selected from the identified boundary. For example, the process 400 can check a comparable on an appraisal report to determine if the comparable has been selected from the identified neighborhood. The appraisal report can be flagged for fraud or further review if the comparable was not selected from the identified neighborhood. In some embodiments, the process 400 can generate two networks, one using comparables identified by appraisers and one using comparables identified by an Automated Valuation Model (e.g., available from CoreLogic, Inc. (Irvine, Calif.)). Based on the differences between the networks generated using comparables identified by appraisers and the Automated Valuation model, appraisals may be flagged for inconsistency or further review. At block 412, the process 400 can optionally append to the network additional information (e.g., geocoded information) associated with the objects. This can allow for blending the network information with other information such as geographic information.

At block 416, the process 400 can identify from a plurality of boundaries a first boundary that is a substitute for a second boundary. For example, the determination process 300 can identify from a plurality of neighborhoods a first neighborhood that is a substitute for a second neighborhood. At block 420, optionally, the process 400 can provide a graphical user interface that displays the network, the boundary (e.g., a neighborhood), a map of the objects (such as within a geographic region), or a combination thereof. Optionally, the process 400 can provide the network, the nodes, or the boundary (e.g., a neighborhood) to an automated valuation model.

Example System for Determining Neighborhood Boundaries

Figure 5:
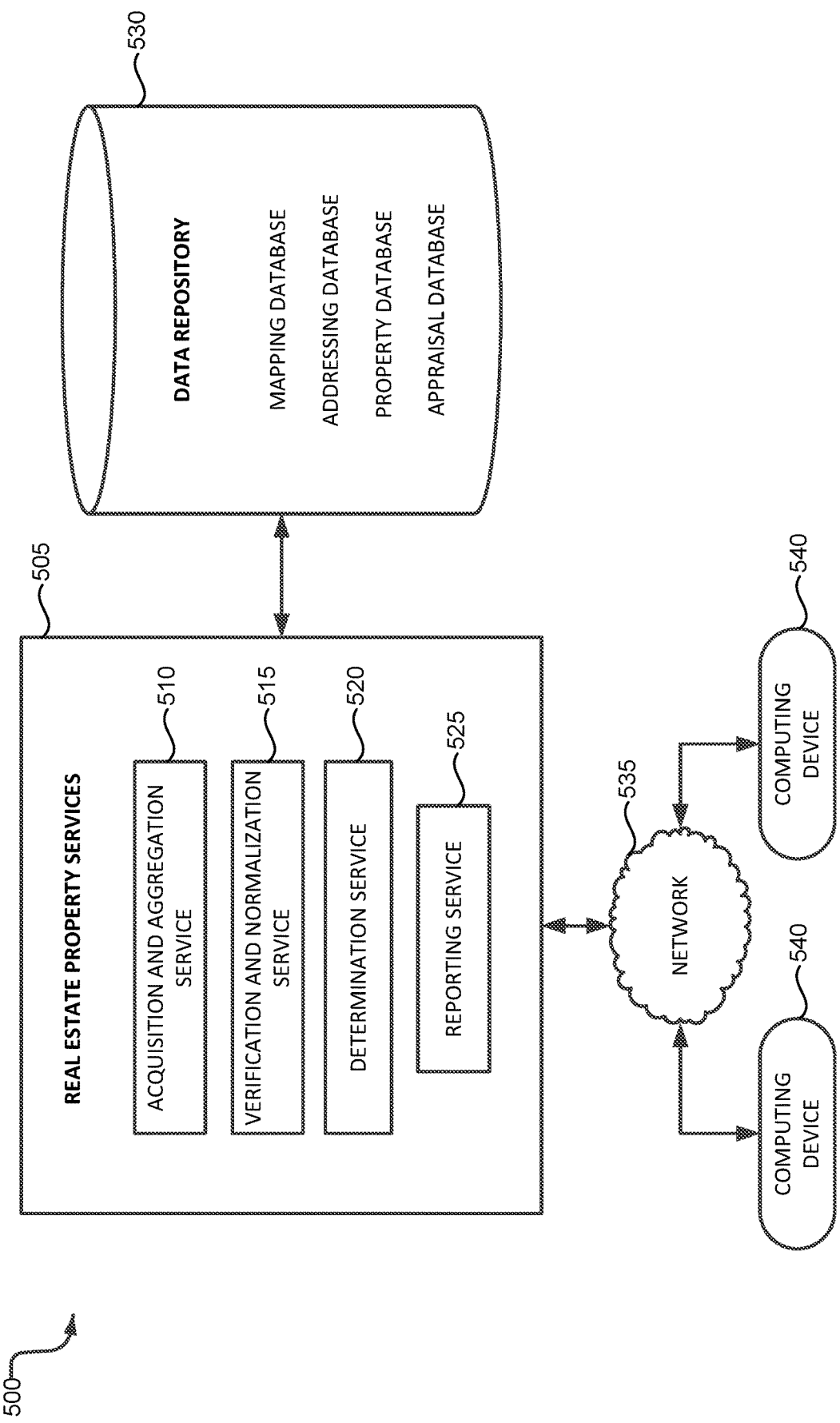
FIG. 5 is a block diagram schematically illustrating an example of a data mining engine for mining evaluations reports of objects such as appraisals reports of real estate properties.

FIG. 5 is a block diagram schematically illustrating an example of a data mining engine 500 for mining evaluations reports of objects such as appraisals reports of real estate properties. The data mining engine 500 can provide services for inter-relating, indexing, and organizing data records stored in a database or as computer files, and more particularly to linking or associating data records relating to real estate properties by, for example, establishing neighborhoods.

The example data mining engine 500 can provide precise address standardization and can use multiple data sources to convert physical address or locations into precise geographic coordinates. The data mining engine 500 can integrate information relating to street geometry, street-segment attribution, postal delivery locations, and individual properties. For example, in various embodiments, the data mining engine 500 can provide services to identify points inside or near a property, establish distance(s) to coastlines, rivers, or other natural hazard areas, spatially compute map feature types (e.g., points, lines, polygons), provide post code centroids, city centroids, and intersections, or provide property ownership information.

The data mining engine 500 illustrated in FIG. 5 includes a set of real estate property services 505 that are accessible over a network 535 via one or more computing devices 540. The property services 505 can access a data repository 530 (e.g., via the network 535) to perform various types of property data management tasks, including tasks associated with property acquisition and aggregation 510, verification and normalization 515, boundary/neighborhood determination 520, and reporting 525. The services 510, 515, 520, and 525 can be implemented as software or machine-readable instructions that are stored in a memory. In the illustrated embodiment, the data repository 530 includes a database of mapping data, a database of addressing data, a database of property data, or a database of appraisal data. Although depicted as separate databases, some of these data collections may be merged into a single database or distributed across multiple distinct databases. Further, additional databases containing other types of information may be maintained and used by the property services 505.

The mapping database can include Geographic Information Systems ("GIS") data associated with real estate properties. The mapping database can include boundary for the properties. Boundary data for a property may include boundary coordinates and, in some cases, the property geometry may be defined as polygon data (e.g., coordinates of polygon corners, vertices, nodes, or edges). Coordinates may include latitude and/or longitude coordinates or other coordinate types. The mapping database can include shape files for the properties, which may include designators to indicate where coordinates begin and end for a property geometry (e.g., the coordinates for a geometry may be placed on the same line or may be surrounded on either side by a geometry indicator (such as an asterisk or backslash). Mapping data can be obtained from one or more mapping services providers such as Google, Apple, HERE, TomTom, etc.

The addressing database contains addressing data obtained from one or more entities, such as government agencies (e.g., cities, counties, etc.), the U.S. Postal Service, etc. that include mailing address data associated with real estate properties. Addressing data for a property can include an address number, a street name, a directional (e.g., direction information such as N, S, E, W, NE, NW, SE, SW), which may be predirectional (before the street name) or postdirectional (after the street name), city name, state, zip code, and/or country.

The property database can include information acquired or aggregated for real estate properties. For example, property data can be obtained from multiple entities such as a county recorder's office, a tax assessor's office, private entities (e.g., CoreLogic, Inc., Irvine, Calif.), etc. Property data can include attributes of real estate properties such as, e.g., address, assessor parcel number (APN), tax identification number, as well as information on the owner (or occupier) of the property.

As one example, the real estate property data stored in the data repository 530 can include data records on properties in several thousand counties in the U.S., accounting for 140 million parcels nationwide. Accordingly, highly specialized computer techniques are necessary to index, organize, and link these hundreds of millions of data records in the databases.

The appraisal database can include information acquired or aggregated for real estate properties used as comparables in appraisals. For example, appraisal data can be obtained from private entities such as CoreLogic, Inc. (Irvine, Calif.), appraisers, banks, mortgage brokers, etc. Appraisal data can include attributes of real estate properties such as properties used as comparables in appraisals, time of appraisals, prices of properties, or conditions and upgrades of the properties.

The real estate property services 505 can include services for property acquisition and aggregation 510, verification and normalization 515, boundary/neighborhood determination 520, and reporting 525. For convenience herein, the data management operations may be said to be performed on properties, and this is to be understood as meaning the data management operations are performed on a property data (e.g., property data records stored in a property database) rather than on the physical real estate properties referenced by the property data.

The acquisition and aggregation service 510 can acquire property data (including appraisal data) from one or more sources (governmental or commercial) and store the aggregated property information in the property database and/or the appraisal database in the data repository 530. Scripts may be used to perform data standardization and/or normalization of property data or appraisal data from different sources into a common format database or collection of databases. For example, data may be collected from sources (e.g., external) and scripts may be used to convert the data, clean-up/repair data, and track data during the acquisition process. Scripts may perform these functions in an automated manner or may execute with manual assistance from a system user (e.g., through a graphical user interface).

The verification service 515 can verify the accuracy of the acquired property or appraisal data by comparing to the appraisal data and/or the address data. Data verification may be performed before the aggregated property data is stored in the property database. Various algorithms may be performed for the verification. For example, weights and/or priorities may be applied to the appraisal data received from certain sources or generated by certain appraisers. In some regions the appraisal data may be known to be more accurate than in other regions. In regions with higher accuracy data, a higher weight/priority may be applied in the verification process. Higher priority/weight can be used to determine the accuracy of the property attributes and what, if any, adjustments and/or additions should be made to the property attributes. In some embodiments, a weighted matching algorithm may be applied to the property attributes to determine when the property data (such as appraisal data) has been verified. For example, the property attributes and appraisal data may be compared, and a match score based on the weights can be determined. If the match score exceeds a certain threshold, then the property data may be considered verified.

The boundary/neighborhood determination service 520 can be configured to include or exclude properties in a neighborhood of a given property. For example, the boundary/neighborhood determination service 520 can implement embodiments of boundary/neighborhood determination process 300 described above. In some embodiments, the boundary/neighborhood determination process 300 starts with evaluation records such as appraisal reports. The determination service 520 can parse the evaluation records to identify objects having similar characteristics (e.g., properties that have been used as comparables in appraisals). By representing objects as nodes in a graph, the determination service 520 can establish edges between nodes representing the identified objects. A network can be generated from the nodes and the edges. The determination service 520 can then identify, from the network, a boundary comprising nodes having similar characteristics (e.g., area, number of bedrooms, etc.).

The reporting service 525 can provide or output information about the properties to a system administrator or customer (e.g., a real estate agent or an insurance company). For example, the reporting service 525 may provide information via electronic mail, via a web-based interface (e.g., using suitable application programming interface (API) commands), over the network 535, etc. The reporting service 525 may store the property information acquired, updated, or generated by the services 505 in a data store (e.g., the data store 530 shown in FIG. 5 or some other data store) where the property information can be accessed by appropriate parties. Although the data mining engine 500 of FIG. 5 is shown as comprising several separate services for providing the property services 505, this is for purposes of illustration and is not intended to limit the scope of the data mining engine. In other implementations, some or all of the functionality of the illustrated services may be combined, rearranged, or left out.

One or more computing devices 540 can obtain the services 505 from the geocoding engine 500 over a network 535. For example, an administrator or manager can use a computing device 540 to manage the system, or a customer, such as a real estate broker, insurance provider, government agency, etc., can use a computing device to request or access one or more of the real estate services. The computing devices 540 can include general purpose computers, servers, data input devices (e.g., terminals or displays), web interfaces, portable or mobile computers, laptops, or tablets, smart phones, etc. The network 535 can provide wired or wireless communication between the computing devices 540 and the services 505 provided by the data mining engine 500. In some implementations, the real estate property data store 530 can communicate with the services 505 (and/or the computing devices 540) over the network 535. The network 535 can be configured as a local area network (LAN), a wide area network (WAN), the Internet, an intranet, combinations of the same, or the like. In certain embodiments, the network 535 can be configured to support secure shell (SSH) tunneling or other secure protocol connections for the transfer of data between the data mining engine 100, the computing devices 540, and/or the data store 530.

The data mining engine 500 and the real estate property services 505 can be implemented on computer hardware, such as one or more physical computer servers programmed with specific computer-executable instructions. The data store 530 can be implemented on any type of computer storage medium (e.g., non-transitory data storage). Although illustratively shown as a single data store in FIG. 5, the real estate property data can be stored on any number of data stores.

The data mining engine 500 may access machine-readable versions of the real estate property data (e.g., information stored on the data store 530). For example, the machine-readable version can include an extensible markup language (XML) version of the data fields in a data record. The fields can include numerical, Boolean, or alpha-numeric values. The data mining engine 500 may use such data, or information based on an analysis of such data that is obtained from public or proprietary data sources (e.g., from CoreLogic, Inc., Irvine, Calif.).

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   non-transitory computer storage configured to store a plurality of records; and
   a hardware processor in communication with the non-transitory computer storage, the hardware processor programmed to:
   determine that a first object and a second object appear in a first record in the plurality of records;
   determine that the first object and a third object appear in a second record in the plurality of records;
   generate a network based on the determination that the first object and the second object appear in the first record and the determination that the first object and the third object appear in the second record, wherein the network identifies the first, second, and third objects as being related; and
   generate a user interface displaying the network overlaying a geographic map, wherein the geographic map comprises a graphical representation of the first object, a graphical representation of the second object, and a graphical representation of the third object, wherein the geographic map comprises an indication that the first and second objects fall within a first boundary and that the third object falls within a second boundary, wherein the second boundary is nonoverlapping with, but related to, the first boundary, and wherein the second boundary is separated from the first boundary by a barrier.

2. The system of claim 1, wherein the hardware processor is further programmed to determine that the first object is a comparable for the second object.

3. The system of claim 1, wherein the first object comprises a real estate property.

4. The system of claim 1, wherein the second object has a degree of separation from the first object that is less than a threshold degree of separation.

5. The system of claim 1, wherein the hardware processor is further programmed to determine a quality status of the network, wherein the quality status of the network is based on a structure of the network.

6. The system of claim 1, wherein the hardware processor is further programmed to append to the network geocoded information associated with the plurality of objects.

7. The system of claim 1, wherein the first boundary comprises one of a neighborhood or a local area network.

8. The system of claim 1, wherein the network comprises an edge between a first node representing the first object and a second node representing the second object.

9. The system of claim 1, wherein the hardware processor is further programmed to flag the first record for inconsistency or further review in response to a determination that a comparable was not selected from within the first boundary.

10. The system of claim 9, wherein the inconsistency comprises a fraud.

11. The system of claim 9, wherein the first record comprises an appraisal of real estate properties.

12. The system of claim 1, wherein the user interface displays the barrier.

13. The system of claim 1, wherein the hardware processor is further programmed to output information associated with the first, second, and third objects via one of an electronic mail or a network-based interface.

14. A method comprising:
under control of a hardware processor:
determining that a first object and a second object appear in a first record;
determining that the first object and a third object appear in a second record;
generating a network based on the determination that the first object and the second object appear in the first record and the determination that the first object and the third object appear in the second record, wherein the network identifies the first, second, and third objects as being related; and
generating a user interface displaying the network overlaying a geographic map, wherein the geographic map comprises a graphical representation of the first object, a graphical representation of the second object, and a graphical representation of the third object, wherein the geographic map comprises an indication that the first and second objects fall within a first boundary and that the third object falls within a second boundary, wherein the second boundary is nonoverlapping with, but related to, the first boundary, and wherein the second boundary is separated from the first boundary by a barrier.

15. The method of claim 14, wherein determining that a first object and a second object appear in a first record further comprises determining that the first object is a comparable for the second object.

16. The method of claim 14, wherein the second object has a degree of separation from the first object that is less than a threshold degree of separation.

17. The method of claim 14, further comprising determining a quality status of the network, wherein the quality status of the network is based on a structure of the network.

18. The method of claim 14, wherein the first boundary comprises one of a neighborhood or a local area network.

19. The method of claim 14, wherein the barrier comprises one of a firewall, a mountain, or a river.

20. The method of claim 14, further comprising outputting information associated with the first, second, and third objects via one of an electronic mail or a network-based interface.

* * * * *